(12) United States Patent
Lalone

(10) Patent No.: US 8,042,882 B2
(45) Date of Patent: Oct. 25, 2011

(54) TRUCK/TRAILER BRAKE CONTROL SYSTEM

(76) Inventor: Duane R. Lalone, Alma, MI (US)

( * ) Notice: Subject to any disclaimer, the term of this patent is extended or adjusted under 35 U.S.C. 154(b) by 1022 days.

(21) Appl. No.: 11/973,088

(22) Filed: Oct. 5, 2007

(65) Prior Publication Data

US 2009/0091179 A1  Apr. 9, 2009

(51) Int. Cl.
*B60T 13/00* (2006.01)

(52) U.S. Cl. .......... 303/7; 303/9.61; 303/9.65; 303/123; 188/3 H; 137/595; 137/594

(58) Field of Classification Search .................. 303/7, 8, 303/9.61, 9.65, 123; 188/3 H, 282.7; 137/594, 137/595, 596, 625.21, 625.31
See application file for complete search history.

(56) References Cited

U.S. PATENT DOCUMENTS

| | | | |
|---|---|---|---|
| 398,830 A | 3/1889 | Haberkorn | |
| 1,418,434 A | 6/1922 | Finch et al. | |
| 1,695,245 A | 12/1928 | Dukesmith | |
| 1,801,850 A | 4/1931 | Good | |
| 2,266,817 A | 12/1941 | Schober | |
| 2,676,675 A | 4/1954 | Rumbold | |
| 2,894,763 A | 7/1959 | Karnath et al. | |
| 3,095,245 A | 6/1963 | Alfieri | |
| 3,228,730 A | 1/1966 | Schubert | |
| 3,234,958 A * | 2/1966 | Butters | 137/328 |
| 3,929,381 A * | 12/1975 | Durling | 303/118.1 |
| 4,501,451 A | 2/1985 | Reynolds et al. | |
| 4,880,032 A * | 11/1989 | Doutt | 137/625.19 |
| 5,061,015 A * | 10/1991 | Cramer et al. | 303/7 |
| 5,458,357 A | 10/1995 | Wohlhuter | |
| 6,206,028 B1 * | 3/2001 | Holden et al. | 137/271 |
| 6,758,536 B2 * | 7/2004 | Jacob | 303/7 |
| 6,886,508 B1 * | 5/2005 | Luffy | 123/73 AD |

* cited by examiner

*Primary Examiner* — Robert Siconolfi
*Assistant Examiner* — Mariano Sy

(57) ABSTRACT

A braking system for a combined tractor-trailer assembly wherein a leading trailer is coupled to a towing tractor and a trailing trailer is coupled to the leading trailer. All of the wheels of the trailers are provided with brakes which may be applied and released in response to the operation of a brake control pedal operated by a driver in the tractor. The brakes also may be applied to the trailing trailer whenever the latter is parked. The brakes of the trailing trailer normally are maintained in applied condition by a spring assisted mechanism when such trailer is parked. Such mechanism normally is disabled by pressurized fluid when the trailer is in service and the pressured fluid is accessible via a valve which simultaneously enables the parking brakes and service brakes simultaneously to be coupled to and uncoupled from the pressure fluid system.

4 Claims, 2 Drawing Sheets

TRUCK/TRAILER BRAKE CONTROL SYSTEM

This invention relates to a braking system especially adapted for use in conjunction with a tractor-trailer combination wherein the tractor is coupled to a first or leading trailer and such trailer is coupled to a second or trailing trailer.

BACKGROUND OF THE INVENTION

It is conventional to couple a truck tractor to a leading or first trailer and to couple the leading trailer to a second or trailing trailer. The tractor has ground engageable wheels provided with brakes, the first trailer has ground engageable wheels provided with its own brakes, and the second trailer has ground engageable wheels provided with its own brakes. When the tractor and the two trailers are in condition for operation, all of the brakes should be operable from the tractor in response to the driver's actuation of a brake pedal. When the first trailer is uncoupled from the tractor and parked, the brakes of such trailer are applied via a spring assist mechanism. When the second trailer is uncoupled from the first trailer and parked, the brakes of the second trailer are applied via a similar spring assist mechanism. The brakes of the second trailer will continue to be applied until such trailer is coupled to the first trailer and the spring assist mechanism deactivated by means of pressurized fluid. To release the parking brakes of the second trailer and to operate the brakes of both trailers in unison such brakes must be coupled to a fluid (air) compressor which normally is positioned within the tractor.

It is essential that the brakes of both trailers be operable simultaneously so as to apply and release the brakes in unison. However, current brake systems utilize one valve for controlling the application and release of the brakes when the trailer is parked and a second valve for controlling the application and release of the brakes when the second trailer is in service. In some instances, one or the other valve is improperly set, thereby adversely affecting the performance of the second trailer's brakes. For example, if the appropriate valve associated with the parking brake control mechanism is not actuated to couple the spring assist brake mechanism to the source of pressure fluid, the parking brakes of the trailing trailer will not be released, thereby making it impossible for the assembled tractor and trailers to operate effectively.

In the event the spring assisted brake mechanism is uncoupled from the source of pressurized fluid during service operation of the vehicles, the brakes of the trailing trailer may remain in their released or inactive condition, thereby creating a hazardous condition wherein such trailer may be movable when it has been parked. Further, in the event the pedal actuated braking mechanism of the trailing trailer is not disconnected from the pressurized fluid source, it may not be possible to effect proper braking operation under the control of the driver.

A principal object of the apparatus disclosed herein is to provide an improved brake control system for use in connection with tractor-trailer combinations wherein there are at least two trailers coupled to one another in tandem.

SUMMARY OF THE INVENTION

Brake control apparatus constructed in accordance with the invention is especially adapted for use in conjunction with tractor-trailer combinations comprising a tractor having ground engaging wheels, some of which are steerable and others of which provide traction. The tractor includes a source of pressurized fluid for use with the tractor's brakes and for use with the brakes of a first or leading trailer coupled to the rear of the tractor, such trailer having ground engageable wheels each of which is provided with a brake mechanism. A second or trailing trailer is coupled in tandem to the leading trailer and it, too, is provided with ground engageable wheels each of which has a braking mechanism associated therewith. The tractor includes a source of pressurized fluid which is coupled to the brakes of both trailers by two separate sets of fluid circuits. It is conventional for the brakes of each trailer to be applied when such trailer is parked, i.e., not in use. One of the pressure fluid circuits is coupled to the spring assist parking brake applying mechanism so as to disable the latter and effect release of the parking brakes when the trailers are to be placed in operation. The pressure fluid source also is coupled to each of the brake mechanisms by a second pressurized fluid circuit via a driver-operated pedal in such manner that, when the driver actuates the pedal, pressure fluid is applied to the brake operating mechanisms of both trailers to apply the brakes to the wheels.

It is conventional to couple the brake pressure fluid conduits of the leading trailer to one of the brake fluid conduits of the trailing trailer via a valve which is operable to enable or disable pressurized fluid flow from the leading trailer to the trailing trailer so as to position the spring assisted parking brake applying mechanism in its brake-release condition. It also is conventional to couple the service pressure fluid line of the leading trailer via a valve to the service fluid pressure line of the trailing trailer in such manner as to enable the brakes of both trailers simultaneously to be applied and released in response to the driver's operation of the brake pedal. For proper operation of the brakes both valves should be either in their open or closed positions. However, the person whose responsibility it is to place the valves in their proper positions sometimes overlooks the adjustment of one or both valves as a consequence of which the operation of the brakes of the trailing trailer is adversely affected.

The brake control apparatus constructed in accordance with the invention includes a dual valve assembly enabling both the aforementioned pressure fluid lines of the trailing trailer to be connected to or disconnected from the pressure fluid source simultaneously via a single valve operator.

THE DRAWINGS

Apparatus constructed in accordance with the presently preferred embodiment of the invention is illustrated in the accompanying drawings wherein.

DETAILED DESCRIPTION

Figure 1:
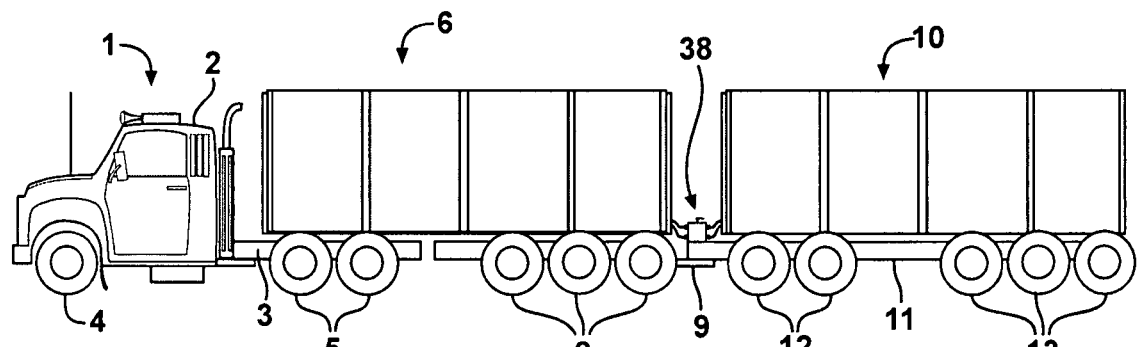
FIG. 1 is a side elevational view of a tractor coupled to a leading trailer which, in turn, is coupled to a trailing trailer.

Brake control apparatus according to the invention is adapted for use with a tractor 1 having a cab 2 supported on a frame 3 provided with steerable ground engaging wheels 4 and traction wheels 5. The frame 3 supports a coupling mechanism, such as a fifth wheel (not shown) to which is coupled a leading trailer 6 having a frame 7 on which is mounted a plurality of ground engageable wheels 8. At the rear of the trailer 6 is a coupling 9 for removably coupling to the leading trailer a trailing trailer 10 having a frame 11, steerable wheels 12 and rear ground engageable wheels 13. The construction and arrangement are such that the tractor 1 is capable of towing both the leading trailer 6 and the trailing trailer 10.

Associated with each of the wheels 4, 5, 8, 12, and 13 is a conventional brake assembly 14 having wheel engageable brakes (not shown) movable between applied and released conditions in a conventional manner. Each brake assembly 14 includes a spring assist assembly 15 of known construction by means of which the brakes constantly are spring biased to their applied condition. The assembly 15 may be of the kind characterized as Life Seal actuators and manufactured by Haldex Brake Products Corporation, of Kansas City, Mo. Each such assembly has a first diaphragm acted on by a spring operable to apply the associated brakes of the assemblies 14. However, the brakes can be released in response to the application of pressure fluid to overcome the force of the springs. Each assembly 15 has a second diaphragm that is responsive to the application and release of fluid pressure to apply and release the brakes under the control of the driver.

Figure 2:
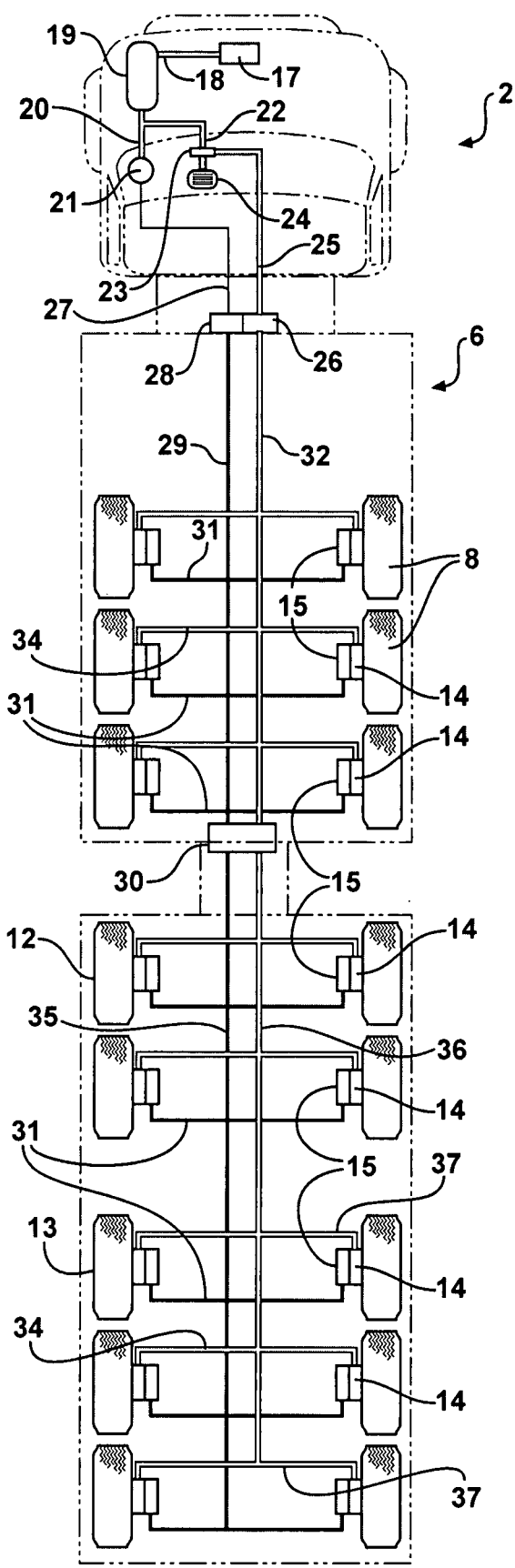
FIG. 2 is a plan view showing diagrammatically the tractor, the leading and trailing trailers, the brake mechanism and the pressure fluid circuits.

Typical pressure fluid circuits for controlling the brakes are illustrated in FIG. 2 and comprise an air compressor 17 mounted in the cab 2 and coupled by a line 18 to a pressurized fluid supply tank 19. In communication with the tank 19 is a pressurized fluid line 20 coupled to an air release valve 21 mounted in the cab. Also coupled to the line 20 is another fluid line 22 which passes through a valve 23 operated by a pedal 24 or other suitable actuator under the driver's control. The valve 23 is coupled to a pressure fluid line 25 which leads to a junction 26 mounted on the leading trailer 6. The fluid release valve 21 is connected by a suitable line 27 to a junction 28 mounted on the leading trailer 6 adjacent the junction 26.

From the junction 28 extends a pressure fluid line 29 (shown as a single solid line) which extends rearwardly of the trailer 6 to a valve housing 30. The fluid line 29 is coupled to each brake spring assist assembly 15 by branch lines 31. From the pedal-operated valve 23 through the junction 26 extends a pressure fluid line 32 (shown as two parallel lines) to the valve housing 30. The line 32 is connected to each of the brake assemblies 14 by branch lines 34.

From the control valve housing 30 mounted at the rear of the leading trailer 6 is a pressure fluid conduit 35 which extends in continuation of the conduit 29 and is coupled to each of the spring assist brake mechanisms 15 of the trailer 10. Also extending as a continuation of the line 32 from the valve housing 30 is a conduit 36 which is coupled by branch lines 37 to the brake mechanisms 14 of the trailing trailer.

The construction and arrangement of the pressure fluid system are such that, whenever the leading trailer 6 is parked the parking brakes are applied via the associated spring assist mechanisms 15, and whenever the trailing trailer 10 is parked the parking brakes are applied via the spring assist brake mechanisms 15. Whenever the junction 28 is open and in communication with the supply tank 19, such as when the tractor and trailers are in service, the spring assist mechanisms 15 will be in circuit with the conduits 29, 31, and 35 and disabled, i.e., the brakes will be in their released condition. However, when the driver wishes to apply and release the brakes, the pedal 24 may be actuated so as to enable pressure fluid to flow from the storage tank via the conduits 29, 31, and 35 to the brake assemblies 14.

Figure 3:
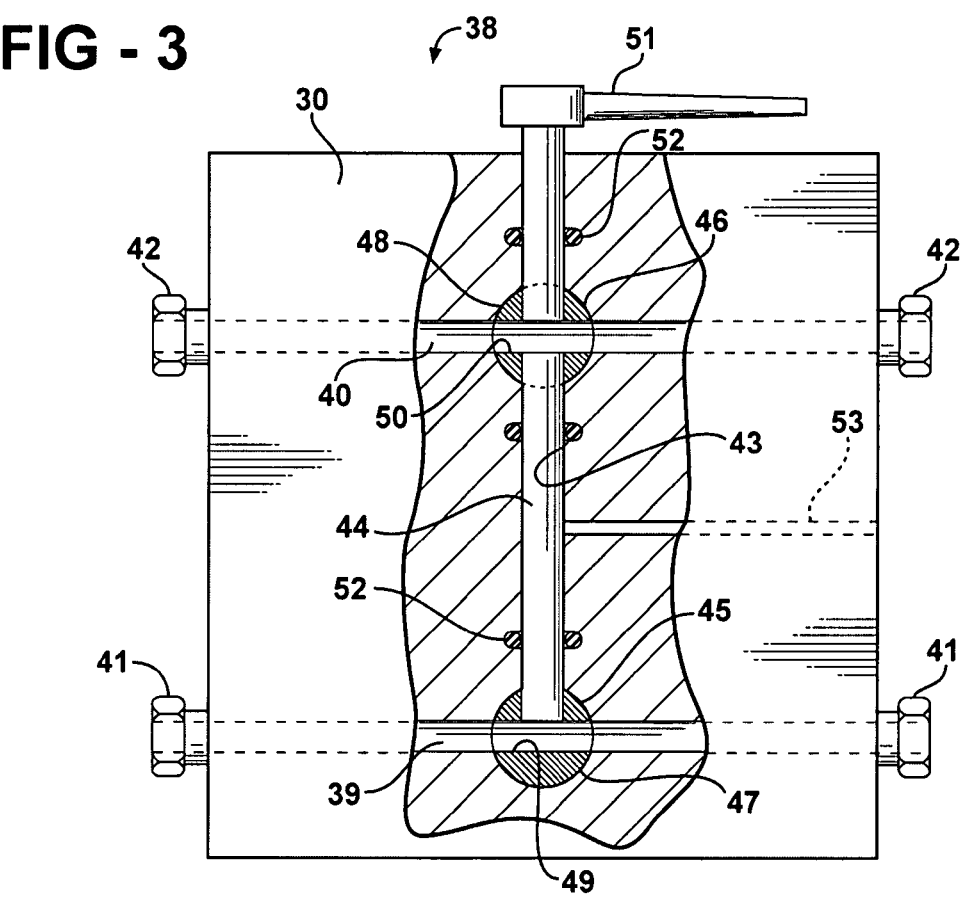
FIG. 3 is an enlarged view partly in plan and partly in section of the control valve assembly.

The valve housing 30 forms part of a control valve 38 which is best illustrated in FIG. 3 and comprises the body 30 having two spaced apart, parallel passages 39 and 40 extending therethrough from end to end. The passage 39 is fitted with couplings 41 at its opposite ends by means of which the conduits 29 and 35 may be coupled to the control valve 38. At the opposite ends of the passage 40 are similar couplings 42 by means of which the pressurized fluid lines 32 and 36 may be connected to the valve. Extending from one side of the body 30 toward the opposite side is a bore 43 in which is accommodated a rotary shaft 44. At the intersection of the shaft 44 with the passage 39 is a spherical chamber 45 and a similar chamber 46 is provided at the intersection of the bore 43 with the passage 40. Rotatably accommodated in the chamber 45 is a ball valve body or rotor 47 which is fixed to the shaft 44 and a similar ball valve body or rotor 48 is accommodated in the chamber 46 and fixed to the shaft 44. The rotor 47 has a passageway 49 therethrough and a similar passageway 50 extends through the rotor 48. One end of the shaft 44 extends beyond the body 30 and has fixed thereto an operating arm or lever 51.

At intervals along the length of the shaft 44 are O-ring seals 52. Between two adjacent ones of the seals is a vent passage 53 inboard of both passages to guard against the possibility of fluid pressure flowing between the passages 39 and 40 in the event of failure of one or both of the seals.

As shown in FIG. 3, the valve rotors 47 and 48 are in a position in which pressure fluid may pass completely through the passages 39 and 40 via the couplings 41 and 42. However, upon movement of the arm 51 through 90°, the valve rotors will be rotated to positions in which they block the flow of pressure fluid through the valve body 30.

When the valve rotors 47 and 48 are in their open positions, as shown in FIG. 3, pressure fluid may flow freely through the passages 39 and 40. When the valve rotors are in their closed positions, however, no fluid can flow through either of the passages. Accordingly, when the trailing trailer 10 is uncoupled from the leading trailer 6, the brake operating pedal 24 is inoperative insofar as the brakes of the trailer 10 are concerned, whereupon the spring assist mechanism associated with each of the brakes of such trailer will move the brakes to their applied condition, thereby enabling the trailing trailer to be parked in a stable position. Since both of the valve rotors of the control valve 38 move simultaneously to their closed and open positions in response to operation of the crank arm 51, there is no possibility that one of the valves will be open and the other closed. Accordingly, there is no possibility that the trailing trailer's brakes will be unintentionally applied or released.

The disclosed embodiment is representative of a presently preferred form of the invention but is intended to be illustrative rather than definitive thereof. The invention is defined in the claims.

I claim:

1. A braking system for a tractor/trailer combination having a towing tractor, a first trailer coupled to the towing tractor, and a second trailer coupled to the first trailer, said first trailer having a plurality of first trailer ground engageable wheels each of which includes a first trailer compressed air controlled brake assembly, said second trailer having a plurality of second trailer ground engageable wheels each of which includes a second trailer compressed air controlled brake assembly;

a first air pressure circuit including a first circuit air pressure line mounted on said first trailer and connected to each of the first trailer compressed air controlled brake assemblies;

a second air pressure circuit including a second circuit air pressure line mounted on said first trailer and connected to each of the first trailer compressed air controlled brake assemblies;

a third air pressure line mounted on said second trailer and connected to each of the second trailer compressed air controlled brake assemblies and connectable to the first air pressure circuit;

a fourth air pressure line mounted on said second trailer and connected to each of the second trailer compressed air controlled brake assemblies and connectable to the second air pressure circuit;

a valve assembly, for connecting the third air pressure line mounted on said second trailer to the first circuit air pressure line and connecting the fourth air pressure line mounted on said second trailer to the second circuit air pressure line including a valve housing mounted on the first trailer, a first air pressure circuit passage extending through the valve housing, a second air pressure circuit passage extending through the valve housing, spaced from the first air pressure circuit passage and parallel to the first air pressure circuit passage, a bore in a valve body that is transverse to and intersects the first air pressure circuit passage, the second air pressure circuit passage, and extends through a valve body end wall, a first spherical chamber in the valve body at an intersection of the first air pressure circuit passage and the bore in the valve body, a second spherical chamber in the valve body at an intersection of the second air pressure circuit passage and the bore in the valve body, a first spherical ball valve body rotatably mounted in the first spherical chamber, a second spherical ball valve body rotatably mounted in the second spherical chamber, a rotary shaft passing into the bore in the valve body, fixed to the second spherical ball valve body, passing through and fixed to the first spherical ball valve body, a lever fixed to the rotary shaft outside the valve body and manually movable to rotate the rotary shaft, the first spherical ball valve body and the second spherical ball valve body between a closed position in which the second spherical ball valve body closes the second air pressure circuit passage and in which the first spherical ball valve body closes the first air pressure circuit passage and an open position in which a second spherical ball bore through the second spherical ball valve body is in fluid communication with the second air pressure circuit passage through the valve housing, and a first spherical ball bore through the first spherical ball valve body and rotary shaft, and in fluid communication with the first air pressure circuit passage through the valve housing;

a pair of first air pressure circuit passage couplings on the valve housing connecting the first circuit air pressure line on said first trailer and the third air pressure line on said second trailer to the first air pressure circuit passage; and a pair of second air pressure circuit passage couplings on the valve housing connecting the second circuit air pressure line on said first trailer and the fourth air pressure line on said second trailer to the second air pressure circuit passage.

2. A braking system, as set forth in claim 1, including a first O-ring seal positioned in the bore in the valve body adjacent to the second spherical ball valve body and telescopically receiving the rotary shaft;

a second O-ring seal mounted in the bore in the valve body adjacent to the first spherical chamber and between the first spherical chamber and the second spherical chamber and wherein the rotary shaft passes through the second O-ring seal; and a third O-ring seal mounted in the bore in the valve body, telescopically receives the rotary shaft and positioned between the first spherical chamber in the valve body and the lever fixed to the rotary shaft outside the valve body.

3. A braking system, as set forth in claim 2, including a vent passage in the valve housing that extends, from the bore in the valve body between the first O-ring seal and the second O-ring seal, to a vent discharge from the valve housing.

4. A braking system for a tractor/trailer combination having a towing tractor, a first trailer coupled to the towing tractor, and a second trailer coupled to the first trailer, said first trailer having a plurality of first trailer ground engageable wheels each of which includes a first trailer compressed air controlled brake assembly, said second trailer having a plurality of second trailer ground engageable wheels each of which includes a second trailer compressed air controlled brake assembly;

a first air pressure circuit including a first circuit air pressure line mounted on said first trailer and connected to each of the first trailer compressed air controlled brake assemblies;

a second air pressure circuit including a second circuit air pressure line mounted on said first trailer and connected to each of the first trailer compressed air controlled brake assembliers;

a third air pressure line mounted on said second trailer and connected to each of the second trailer compressed air controlled brake assemblies and connectable to the first air pressure circuit;

a fourth air pressure line mounted on said second trailer and connected to each of the second trailer compressed air controlled brake assemblies and connectable to the second air pressure circuit;

a valve assembly, for connecting the third air pressure line mounted on said second trailer to the first circuit air pressure line and connecting the fourth air pressure line mounted on said second trailer to the second circuit air pressure line including a valve housing mounted on the first trailer, a first air pressure circuit passage extending through the valve housing, a second air pressure circuit passage extending through the valve housing, spaced from the first air pressure circuit passage and parallel to the first air pressure circuit passage, a bore in a valve body that is transverse to and intersects the first air pressure circuit passage, the second air pressure circuit passage, and extends through a valve body end wall, a first spherical chamber in the valve body at an intersection of the first air pressure circuit passage and the bore in the valve body, a second spherical chamber in the valve body at an intersection of the second air pressure circuit passage and the bore in the valve body, a first rotor valve body rotatably mounted in the first spherical chamber, a second rotor valve body rotatably mounted in the second spherical chamber, a rotary shaft passing into the bore in the valve body, fixed to the second rotor valve body, passing through and fixed to the first rotor valve body, a lever fixed to the rotary shaft outside the valve body and manually movable to rotate the rotary shaft, the first rotor valve body and the second rotor valve body between a closed position in which the second rotor valve body closes the second air pressure circuit passage and in which the first rotor valve body closes the first air pressure circuit passage and an open position in which a second rotor bore through the second rotor valve body is in fluid communication with the second air pressure circuit passage through the valve housing, and a first rotor bore through the first rotor valve body and rotary shaft and in fluid communication with the first air pressure circuit passage through the valve housing;

a pair of first air pressure circuit passage couplings on the valve housing connecting the first circuit air pressure line on said first trailer and the third air pressure line on said second trailer to the first air pressure circuit passage; and a pair of second air pressure circuit passage couplings on the valve housing connecting the second circuit air pressure line on said first trailer and the fourth air pressure line on said second trailer to the second air pressure circuit passage.

* * * * *